J. L. HULBERT.
METHOD OF MECHANICALLY MILKING.
APPLICATION FILED SEPT. 6, 1911.
1,043,013.
Patented Oct. 29, 1912.
2 SHEETS—SHEET 2.
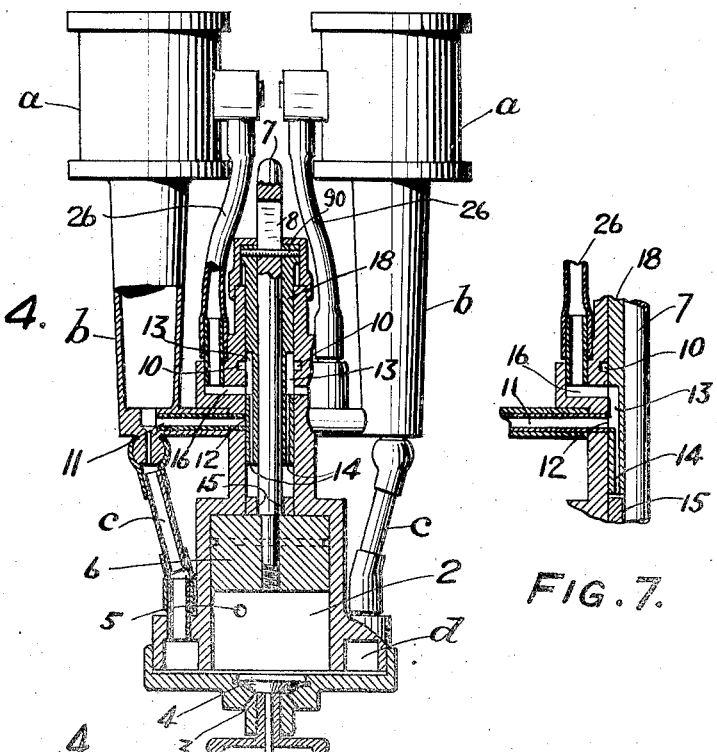
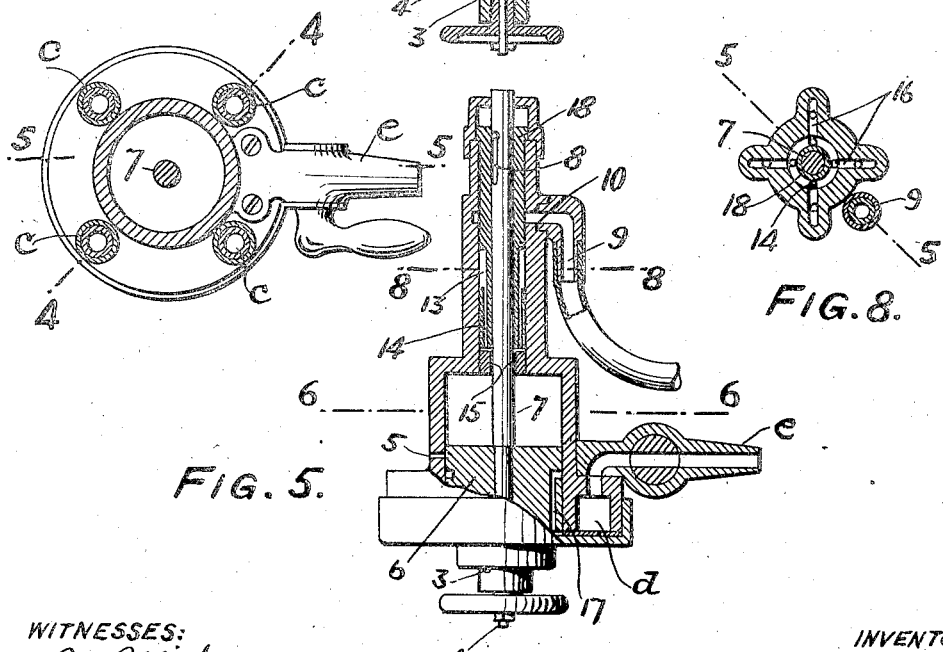
WITNESSES:
INVENTOR
BY
ATTORNEYS.

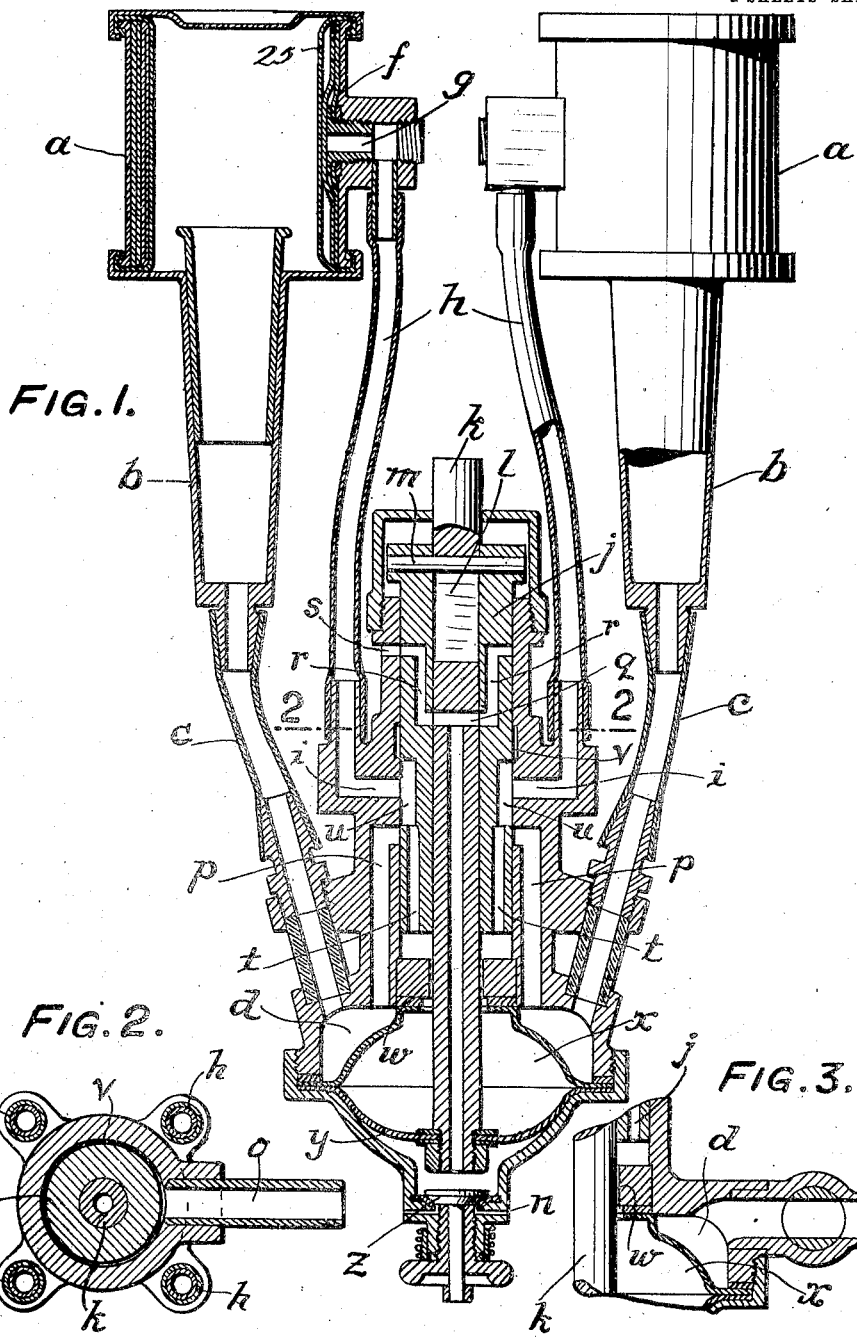

UNITED STATES PATENT OFFICE.

JOHN L. HULBERT, OF POUGHKEEPSIE, NEW YORK, ASSIGNOR TO THE DE LAVAL SEPARATOR COMPANY, A CORPORATION OF NEW JERSEY.

METHOD OF MECHANICALLY MILKING.

1,043,013.           Specification of Letters Patent.         Patented Oct. 29, 1912.

Original application filed June 30, 1911, Serial No. 636,144. Divided and this application filed September 6, 1911. Serial No. 647,885.

*To all whom it may concern:*

Be it known that I, JOHN L. HULBERT, a citizen of the United States, residing at Poughkeepsie, county of Dutchess, and State of New York, have invented a new and useful Improvement in Methods of Mechanically Milking, of which the following is a full, clear, and exact description, reference being had to the accompanying drawings, which form a part of this specification.

My invention consists in certain improvements in milking machines whereby a more efficient result is obtained.

My invention relates to a milking machine which is provided with teat cups each of which contains an inflatable cushion or cushions. By admitting air to and exhausting it from these inflatable cushion or cushions in each cup, a pulsation is produced. These teat cups have a conical extension from their lower end which surrounds the teat, and through which the extracted milk passes.

In my improvement the conical extensions have connecting pipes which extend to a milk receiving chamber having an outlet tube. This milk chamber and its outlet tube are constantly under a vacuum or partial vacuum. The drawing off of the milk by constant vacuum is more efficient than a pulsating action, because it milks more thoroughly, but on the other hand, it produces a drawing upon the teat which is irritating and hurtful. A pulsation will draw off the milk more quickly and will not draw or swell the teat, as in the case of constant vacuum.

The principle of my invention is to provide a pulsating action when the flow is large, and when it grows smaller and more difficult to draw off, to decrease the pulsating action until finally when the flow reaches the smallest point *i. e.* at or about the end of the milking; it approaches a constant vacuum without any substantial pulsation which results in drawing off all the milk. This results from the arrangement, hereinafter described, where the exhaust from the cushion passes directly or indirectly through the milk receiving chamber under vacuum. With this arrangement, initially, when the flow of milk is free, a pulsating action of considerable amplitude is produced, but when the flow becomes small and the milk difficult to extract, the vacuum increases and the pulsating amplitude decreases. As will be seen, when treating specifically of the apparatus, this effect is produced because when the milk flows most freely, the pipe connection to the vacuum is full of milk and the air exhausted from the cushion chamber produces a pulsation of the greatest amplitude. As the flow decreases, the milk in the pipe connection becomes less and a part of the air is carried toward the vacuum and the pulsations become less, and the vacuum stronger. This continues until the final extraction of the milk, when the extraction is so difficult, and the flow so small, that practically all the exhaust air is enabled to go to the vacuum and the action on the teat becomes practically vacuum alone, there being practically no pulsation or a very low pulsation.

In my invention I start the milking initially with a pulsating action of considerable amplitude and low vacuum, and as the milking proceeds, decreasing the pulsating amplitude and increasing the strength of the vacuum. Further, with my improved apparatus, the pressure upon the lower part of the teat is less than the pressure on the upper part. If the pressure in the cushion *i. e.* the pressure on the upper part of the teat, is not greater than that on the lower part, the milk passage in the teat might be closed.

My invention also consists in certain other improvements, which generally speaking, may be stated as follows: Providing a controlling valve initially moved by a diaphragm, and subsequently by air admitted in the movement of the valve by the diaphragm. A milk chamber, an inflatable diaphragm for moving the valve and admitting pressure to the diaphragm and exhausting into the milk chamber. Providing a milk chamber having a tube adapted to convey milk in connection with the teat cups, a, which milk chamber is under vacuum. A plurality of milk cups, each having an inflatable cushion or diaphragm, a single valve controlling the admission of air to all of the said cushions, and allowing the air so admitted to exhaust to a milk chamber or to the connections from the cups to the milk chamber, the milk chamber being under a vacuum.

I will now describe the embodiments of my invention shown in the accompanying drawings, and then point out the invention in the claims.

In the drawings: Figure 1 is a sectional view of my apparatus embodying my invention. Fig. 2 is a cross section on line 2—2, Fig. 1. Fig. 3 is a partial section showing outlet from milk chamber to milk receptacle. Fig. 4 is a view of another embodiment of my invention principally in central section on the line 4—4, Fig. 6. Fig. 5 is a sectional view of a part of the form shown in Fig. 4, but taken on the line 5—5, Figs. 6 and 8. Fig. 6 is a section on line 6—6, Fig. 5. Fig. 7 is a view of a part of the apparatus of Fig. 4. Fig. 8 is a section on line 8—8, Fig. 5.

I will first describe the construction shown in Figs. 1-3. $a$ are the teat cups proper, having the conical extension $b$ surrounding the discharge portion of the teat connected with a flexible pipe $c$ leading to the milk receiving chamber $d$. $e$ is the outlet pipe from the milk receiving chamber leading to the milk receptacle, not shown. This pipe $e$ is constantly under suction producing a vacuum or partial vacuum in the milk receiving chamber, the pipe connection between the conical ends of the teat cups and the milk receiving chamber, and in the conical ends of the teat cups each teat cup $a$ is provided with a lining 25. The space between the lining 25 and the inner wall of the cup forms a cushion chamber in which is placed an inflatable bag or cushion $f$. $g, g$ are inlets to the cushion chambers connected by flexible pipes $h$ with the passages $i$ in the valve casing. The valve comprises the valve proper $j$ and the hollow valve stem $k$. This valve stem has the slotted portion $l$ through which a pin $m$, connected with the valve proper, passes. $o$ is an inlet to the valve casing from a source of pressure supply, not shown. This inlet $o$ terminates in the chamber $v$. $p$ are passages leading from the valve casing to the milk receiving chamber. $q$ is a passage or port through the wall of the valve stem and communicating with hollow portion of the stem. $r$ are exhaust passages in the valve proper communicating with the exhaust port $s$. $t$ is a passage in the valve proper and $u$ is another passage in said valve proper. $v$ is an annular chamber in the valve casing in connection with the pressure passage. The piston stem does not make a close fit with the lower portion of the valve casing, leaving the constricted passage $w$. $x$ is the diaphragm chamber having therein the diaphragm $y$. $z$ is a puppet valve, in the lower portion of the diaphragm chamber $x$ controlling the port $n$. The operation is as follows: When the valve and valve stem are at their lower position, the diaphragm chamber $x$ is by passage $w$, passage $t$ and passage $p$ in connection with the milk chamber, which being under vacuum, relieves the pressure above the diaphragm, the puppet valve lifts, and the air pressure below the diaphragm causes the diaphragm to lift, lifting the hollow valve stem with which it is connected. The stem lifts until the slot and pin connection between it and the valve proper causes the valve to lift also. The lifting of the valve brings passages $u$ and $t$ in communication with the source of pressure supply, and passage $u$ in connection with the passages $i$ leading to the teat cup cushion chambers. This admits air under pressure to the cushion chambers of the teat cups and also beneath the valve, causing it to quickly complete its movement to the top. Through the constricted passage $w$, pressure is also admitted slowly to the diaphragm chamber above the diaphragm $y$ forcing it down slowly and carrying with it the hollow valve stem $k$. This movement is partly resisted by the compression of air below the diaphragm $y$. During the downward movement of the valve stem $k$ the upper end of the slot $l$ strikes the pin $m$ at the instant that the port $q$ registers with the passage $r$. It then carries the valve proper $j$ with it. When the passage $r$ registers with the port $s$ the compression in the space below the diaphragm $y$ is relieved through the hollow stem $k$, the port $q$, passage $r$ and port $s$. A very slight further movement of the valve $j$ covers the groove $v$ and cuts off the supply of compressed air, but the expansion of that already in the space above the diaphragm completes the movement of the diaphragm and by the valve stem $k$ and pin $m$ carries the valve proper $j$ to the position where groove $u$ communicates with passage $p$. The air from below the valve $j$ escapes to the vacuum through passages $t$ and $p$, the milk chamber $d$ and the passage $e$. Atmospheric pressure acting on top of the valve $j$ completes the valve movement and allows the air from cushions $f$ to escape to the milk chamber by way of the inlets $g$, tubes $h$, passages $i$, groove $u$ and passage $p$. The valve is now in the original position and the cycle of operation is repeated.

The construction shown in Figs. 4-8 differs from that described specifically in the following: In the construction of these figures, the exhaust from the cushion chambers of the teat cups is into the conical lower extension of the teat cup instead of into the milk receiving chamber, but this change makes no difference in the principle of operation. Further, the valves for controlling the operation are not precisely the same. I will now describe this construction or the differences between it and the other construction. As in the construction last described, there are teat cups $a$ having an upper portion containing an inflatable cushion $f$ and a conical lower portion $b$ having a liquid pipe connection $c$ with a milk receiving chamber $d$. This milk receiving chamber $d$ has a passage $e$ leading to the milk receptacle. There is a suction constantly on the passage $e$ from a source of suction (not shown) which creates a vacuum or partial vacuum in the passage $e$, the milk receiving chamber $d$ and the teat cup conical lower portion $b$. In this construction instead of providing an exhaust from the inflatable cushion chamber of teat cups $a$ to the milk receiving chamber, I provide an exhaust from said chamber to the lower end of the discharge conical portion of the teat cup. The valve also is different. I will now describe these points of difference. 2 is a chamber having the port 3 controlled by the valve 4 and the exhaust port 5. In this chamber is the piston 6 connected to the rod 7. This piston has a slot 8 through which passes a pin 90 connected to the valve proper 18. 9 is the pressure inlet leading from source of pressure supply, not shown, and terminating in the annular chamber 10. 11 is a passage leading from the port 12 to the conical lower portions $b$ of the teat cups. 13 is a passage in the valve proper 18. 14 is a passage in the valve proper 18, and 15 is a contracted space between the piston rod and its bushing. 16 are passages in the valve casing, connecting through tube 26 with the cushion chambers of the teat cups $a$. In the position shown in Fig. 4, the pressure supply is connected with the pipe leading to cushion chamber of teat cups, and also to top of piston 6. When the pressure is sufficient on top of the piston 6 to move it, it and its rod 7 descend. After moving the length of the slot 8 they carry the valve 18 with them. This downward movement is retarded by the compression of air below piston 6 until passage 17 connects with port 5 and allows the air to escape. The piston then makes a quick downward movement carrying the valve 18 past the lap position. The passage 13 connects 16 and 11 (see Fig. 7), and the air in the inflatable cushion chamber exhausts into the conical discharge portions of the teat cups. The upper portion of chamber 2 above the piston 6 is, through passages 14, 15 and 11, connected with the conical discharge portion of the teat cup, and, it being under constant suction, the air in said portion of the chamber exhausts therethrough. When the air above the piston is exhausted, the valve is allowed to lift, admitting air through the port 3 and the piston is lifted. The first upward movement of the piston is a free movement of the rod 7, which at the end of its free movement, cuts off the connection of passages 13 and 14 with passage 11 and connects the pressure supply with passage 14, which admits air below the valve quickly, lifting the valve by the air, and admits air slowly to the top of piston. Air pressure is also admitted through passage 16 to the cushion chambers. The admission of air rapidly below the valve and slowly above the piston enables the valve to be rapidly raised to its ultimate position while the pressure above the piston is slowly accumulating to a point sufficient to cause the piston to descend.

In both the construction of Figs. 1–3 and that of 4–8, by intermittently exhausting from the cushion chamber to the milk passage from the teat to the milk receptacle, a pressure is intermediately admitted to this passage. Consequently the result initially described in this specification takes place.

I do not herein claim the machine described and illustrated herein as the same forms the subject matter of an application filed by me June 30, 1911, Serial No. 636,144, of which this application is a division, while the specific construction shown in Figs. 4–8 forms the subject matter of a separate application, filed by me June 30, 1911, Serial No. 636,145.

Having now fully described my invention, what I claim and desire to protect by Letters Patent is:

1. The improved method of mechanically milking, which consists in constantly subjecting the discharge portion of the teat to a suction with the source of which it is in constant communication, and independent of the suction and automatically creating pulsations in said suction on the teat.

2. The improved method of mechanically milking, which consists in subjecting the discharge portion of the teat constantly to a suction and causing the milk to tend to vary the intensity of said suction inversely proportionate to the volume of its flow.

3. The improved method of mechanically milking, which consists in subjecting the discharge portion of the teat constantly to a suction, causing the milk to tend to vary the intensity of said suction inversely proportionate to the volume of its flow, and intermittently subjecting the teat, above the discharge, to pressure.

4. The improved method of mechanically milking, which consists in constantly subjecting the discharge portion of the teat to a suction with the source of which it is in constant communication, and, independent of the suction, and automatically, admitting pressure to cause or tend to cause pulsations.

5. The improved method of mechanically milking, which consists in constantly subjecting the discharge portion of the teat to a suction with the source of which it is in constant communication and, independent of the suction, intermittently admitting pressure to cause or tend to cause pulsations.

6. The improved method of mechanically milking, which consists in constantly subjecting the discharge portion of the teat to a suction with the source of which it is in constant communication and, independent of the suction and automatically, intermittently admitting pressure to cause or tend to cause pulsations.

7. The improved method of mechanically milking, which consists in constantly subjecting the discharge portion of the teat to a suction with the source of which it is in constant communication, and, independent of the suction, and automatically, admitting pressure to cause or tend to cause pulsations, and subjecting the teat above the discharge to pressure.

8. The improved method of mechanically milking, which consists in constantly subjecting the discharge portion of the teat to a suction with the source of which it is in constant communication and, independent of the suction, and automatically, admitting pressure to cause or tend to cause pulsations, and intermittently subjecting the teat above the discharge to pressure.

9. The improved method of mechanically milking, which consists in constantly subjecting the discharge portion of the teat to a suction with the source of which it is in constant communication, and, independent of the suction, intermittently admitting pressure to cause or tend to cause pulsations, and subjecting the teat above the discharge to pressure.

10. The improved method of mechanically milking, which consists in constantly subjecting the discharge portion of the teat to a suction with the source of which it is in constant communication, and, independent of the suction, and automatically, intermittently admitting pressure to cause or tend to cause pulsations, and subjecting the teat above the discharge to pressure.

11. The improved method of mechanically milking, which consists in constantly subjecting the discharge portion of the teat to a suction with the source of which it is in constant communication, and, independent of the suction, intermittently admitting pressure to cause or tend to cause pulsations, and intermittently subjecting the teat above the discharge to pressure.

12. The improved method of mechanically milking, which consists in constantly subjecting the discharge portion of the teat to a suction with the source of which it is in constant communication and, independent of the suction, and automatically, intermittently admitting pressure to cause or tend to cause pulsations, and intermittently subjecting the teat above the discharge to pressure.

13. The improved method of mechanically milking, which consists in constantly subjecting the discharge portion of the teat to a suction with the source of which it is in constant communication, and creating pulsations in said suction on the teat, and intermittently subjecting the teat, above the discharge, to pressure.

14. The improved method of mechanically milking, which consists in subjecting the discharge portion of the teat constantly to a suction, and creating pulsations in proportion to the flow of milk, whereby when the flow of milk is greatest, the pulsations are greatest, and when the flow of milk is least the action approximates that of suction alone.

15. The improved method of mechanically milking, which consists in subjecting the discharge portion of the teat constantly to a suction, and creating pulsations in proportion to the flow of milk, whereby when the flow of milk is greatest, the pulsations are greatest, and when the flow of milk is least the action approximates that of suction alone, and intermittently subjecting the teat, above the discharge, to pressure.

16. The improved method of mechanically milking, which consists in subjecting the milk discharge constantly to suction and producing pulsations in said discharge, and varying the amplitude of the pulsations directly as the flow of the milk.

17. The improved method of mechanically milking, which consists in subjecting the milk discharge constantly to suction and producing pulsations in said discharge, and varying the amplitude of the pulsations directly as the flow of the milk, and intermittently subjecting the teat, above the discharge, to pressure.

18. The improved method of mechanically milking, which consists in subjecting the milk discharge constantly to suction and producing pulsations in said discharge, varying the amplitude of the pulsations directly and the strength of the suction inversely as the flow of the milk.

19. The improved method of mechanically milking, which consists in subjecting the milk discharge constantly to suction and producing pulsations in said discharge, varying the amplitude of the pulsations directly and the strength of the suction inversely as the flow of the milk, and intermittently subjecting the teat, above the discharge, to pressure.

20. The improved method of mechanically milking, which consists in subjecting the discharge from the teat constantly to a suction, intermittently compressing the teat by air pressure, and alternately therewith exhausting the air by which the teat is compressed into said discharge, whereby the amplitude of the pulsations becomes less and the intensity of the suction tends to increase as the flow of milk diminishes.

21. The improved method of mechanically milking, which consists in subjecting the discharge portion of the teat constantly to a suction, intermittently compressing the teat by air pressure and, independent of the suction, automatically and intermittently admitting air pressure into the milk discharge, whereby when the milk discharges freely, the exhaust of the air admitted to the milk discharge will be obstructed and therefore tend to maintain a relatively low vacuum therein and when the discharge of milk is relatively small the air admitted to the milk discharge will exhaust freely and tend to maintain a relatively high vacuum therein.

In testimony of which invention, I have hereunto set my hand, at Poughkeepsie, N. Y., on this 19 day of August, 1911.

JOHN L. HULBERT.

Witnesses:
EVERETT H. TRAVIS,
KATHARINE FREER.